United States Patent Office 2,945,000
Patented July 12, 1960

2,945,000

LINEAR POLYESTER COMPOSITIONS CONTAINING AN ALKYL GALLATE AS A HEAT STABILIZER

Selma Harmon Long, John W. Tamblyn, and Louis D. Moore, Jr., Kingsport, Tenn., assignors to Eastman Kodak Company, Rochester, N.Y., a corporation of New Jersey No Drawing. Filed Sept. 21, 1956, Ser. No. 611,368

5 Claims. (Cl. 260—45.85)

This invention relates to the heat stabilization of synthetic linear polyesters of high molecular weight. Linear polyesters are extensively used in textile fibers, which are subject to heating in the processes of washing, drying at elevated temperatures, ironing and pressing. Linear polyesters are also used in films and shaped articles which are subjected to heating in their various uses, such as in electrical insulation and the like. Heating tends to degrade linear polyesters, as has been discussed by H. A. Pohl in Journal of the American Chemical Society 73, 5660–5661 (1951), and by I. Marshall and A. Todd in Transactions of the Faraday Society 49, 67–78 (1953).

When polyesters are heated at elevated temperatures, they degrade in physical properties and in molecular weight as measured by the logarithmic viscosity number, $\{\eta\}$, defined by the equation $$\{\eta\} = \frac{\ln\,(\eta/\eta_0)}{C}$$

where $\eta_0$ and $\eta$ are the viscosities respectively of pure solvent and of a solution containing C grams of polymer per 100 cc. of solvent. The logarithmic viscosity numbers reported herein were measured in a 60:40 mixture by weight of phenol:tetrachloroethane at a polymer concentration of about 0.23 gram/100 cc.

In the course of our investigation of the thermal breakdown of linear polyesters, we have found that the addition of certain compounds to the polyesters retards thermal degradation. The mechanism of this protection is not completely understood, but it has been shown that oxygen has a detrimental effect; therefore, the compounds may be functioning as antioxidants. However, we have found that a great many antioxidants are not stabilizers for linear polyesters.

We have found that linear polyesters can be heat stabilized by the incorporation of a small proportion of an alkyl gallate in which the alkyl group contains from 3 to 18 carbon atoms. The alkyl gallate can be incorporated into the resin either by mixing it into the molten resin, which may then be extruded or molded, or by adding it to a solution or dope of the resin, which may then be cast as a film or spun as a filament. Concentrations of from 0.1 to 10 parts by weight of alkyl gallate per 100 parts by weight of linear polyester may be used; we prefer to use from 0.3 to 3 parts per 100 parts of polyester.

The effectiveness of the stabilizer was tested by placing film strips of the polyester containing the stabilizer in a 200° C. air oven for a given length of time. The values of $\{\eta\}$ were determined before and after the heating. A comparison of these figures with those obtained on a blank of the same batch of polyester provided a measure of the stabilizing effect of the additive.

In the examples given below, alkyl gallates were incorporated in the indicated proportions with two different batches of a linear polyester designated as 1:5:6–A:S:P, made from a 1:5:6 mole ratio of succinic acid:4,4'-dicarboxyphenol sulfone, HOOC—$C_6H_4$.$SO_2$.$C_6H_4$—COOH: 1,5-pentanediol, with a linear polyester designated as 1:1:2–S:C:P, made from a 1:1:2 mole ration of 4,4'-dicarboxyphenyl sulfone:azelaic acid:1,5-pentanediol, and with a linear polyester designated as 3:2:5–T:B:H, made from a 3:2:5 mole ratio of terephthalic acid:sebacic acid:cyclohexane-1,4-dimethanol, $$HO.CH_2.C_6H_{10}.CH_2.OH$$

The preparation of linear polyesters of terephthalic acid, sebacic acid and cyclohexane-1,4-dimethanol is described in application Serial No. 554,639, of Charles J. Kibler, Alan Bell and James G. Smith, filed December 22, 1955, now U.S. Patent No. 2,901,466.

| Examples | Parts Alkyl Gallate per 100 Parts Polyester | Polyester | $\{\eta\}$ Original | $\{\eta\}$ After 15 hrs. |
|---|---|---|---|---|
| 1 | 1 propyl gallate | 1:5:6–A:S:P | 0.68 | 0.65 |
|   | None | Same | 0.70 | 0.49 |
| 2 | 1 octadecyl gallate | Same | 0.70 | 0.66 |
|   | None | Same | 0.70 | 0.49 |
|   | 1 octadecyl gallate | 1:1:2–S:C:P | 0.95 | 0.91 |
| 3 | 3 octadecyl gallate | Same | 0.95 | 0.84 |
|   | None | Same | 0.95 | Insoluble |
| 4 | 1 propyl gallate | 3:2:5–T:B:H | 1.02 | 0.88 |
|   | None | Same | 1.08 | 0.35 |

What we claim as our invention and desire to be secured by Letters Patent of the United States is:

1. A polyester composition comprising a linear polyester of a dihydric alcohol with two dicarboxylic acids, stabilized against degradation by heat by a content of from 0.1 to 10 parts by weight of octadecyl gallate per 100 parts by weight of polyester.

2. A polyester composition comprising a linear polyester of a dihydric alcohol with two dicarboxylic acids, stabilized against degradation by heat by a content of from 0.3 to 3 parts by weight of octadecyl gallate per 100 parts by weight of polyester.

3. A polyester composition comprising a linear polyester of succinic acid, 4,4'-dicarboxyphenyl sulfone and 1,5-pentanediol, stabilized against degradation by heat by a content of from 0.3 to 3 parts by weight of octadecyl gallate per 100 parts by weight of polyester.

4. A polyester composition comprising a linear polyester of 4,4'-dicarboxyphenyl sulfone, azelaic acid and 1,5-pentanediol, stabilized against degradation by heat by a content of from 0.3 to 3 parts by weight of octadecyl gallate per 100 parts by weight of polyester.

5. A polyester composition comprising a linear polyester of terephthalic acid, sebacic acid and cyclohexane-1,4-dimethanol, stabilized against degradation by heat by a content of from 0.3 to 3 parts by weight of octadecyl gallate per 100 parts by weight of polyester.

References Cited in the file of this patent

UNITED STATES PATENTS

| 2,255,191 | Sabalitschka et al. | Sept. 9, 1941 |

FOREIGN PATENTS

| 645,392 | Great Britain | Nov. 1, 1950 |
| 1,110,532 | France | Feb. 14, 1956 |

OTHER REFERENCES

Bergel: Chemistry and Industry, April 1, 1944, pages 127–128.

Cohen et al.: Industrial and Engineering Chemistry, vol. 45, May–August 1953, pages 1766–75.